US009586600B2

(12) United States Patent
Inaba et al.

(10) Patent No.: US 9,586,600 B2
(45) Date of Patent: Mar. 7, 2017

(54) CURVED PLATE FOR RAILCAR BODYSHELL, FRONT CAR BODYSHELL, AND METHOD OF MANUFACTURING CURVED PLATE FOR RAILCAR BODYSHELL

(71) Applicant: KAWASAKI JUKOGYO KABUSHIKI KAISHA, Kobe-shi, Hyogo (JP)

(72) Inventors: Kazumasa Inaba, Kobe (JP); Masaki Kayukawa, Kobe (JP); Kimihiro Koura, Kobe (JP); Kenji Waki, Kobe (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 15 days.

(21) Appl. No.: 14/442,826

(22) PCT Filed: Oct. 24, 2013

(86) PCT No.: PCT/JP2013/006293
§ 371 (c)(1),
(2) Date: May 14, 2015

(87) PCT Pub. No.: WO2014/076887
PCT Pub. Date: May 22, 2014

(65) Prior Publication Data
US 2015/0307114 A1 Oct. 29, 2015

(30) Foreign Application Priority Data
Nov. 14, 2012 (JP) ................................ 2012-250054

(51) Int. Cl.
*B61D 17/00* (2006.01)
*B61D 17/04* (2006.01)
(Continued)

(52) U.S. Cl.
CPC ............. *B61D 17/00* (2013.01); *B61D 17/02* (2013.01); *B61D 17/04* (2013.01); *B61D 17/08* (2013.01); *Y02T 30/32* (2013.01)

(58) Field of Classification Search
CPC ........ B61D 17/00; B61D 17/02; B61D 17/04; B61D 17/041; B61D 17/043; B61D 17/045;
(Continued)

(56) References Cited

U.S. PATENT DOCUMENTS 5,140,913 A * 8/1992 Takeichi ................ B61D 17/04
105/396
5,267,515 A * 12/1993 Tsuruda ............... B61D 17/041
105/397
(Continued)

FOREIGN PATENT DOCUMENTS

JP 2005-263125 A 9/2005
JP 3717426 B2 11/2005

OTHER PUBLICATIONS

Jan. 28, 2014 International Search Report issued in International Patent No. PCT/JP2013/006293.
(Continued)

*Primary Examiner* — Zachary Kuhfuss
(74) *Attorney, Agent, or Firm* — Oliff PLC

(57) ABSTRACT

A curved plate for a railcar bodyshell includes: a plate main body including an outer surface facing an outside of a railcar and an inner surface facing an inside of the railcar and the plate main body having a curved shape; and reinforcing ribs projecting from the inner surface of the plate main body toward the inside of the railcar. At least two of the plurality of the reinforcing ribs include machining reference surfaces formed on a same plane as reference surfaces used when machining an outer surface of the plate main body. At least one of the plurality of the reinforcing rib includes a mount-
(Continued)

ing reference surface perpendicular to one of a rail direction, a sleeper direction, and a vertical direction as a reference surface used when mounting the curved plate to the railcar.

7 Claims, 7 Drawing Sheets

(51) Int. Cl.
*B61D 17/02* (2006.01)
*B61D 17/08* (2006.01)

(58) Field of Classification Search
CPC ....... B61D 17/046; B61D 17/08; Y02T 30/32; Y10T 29/49622
USPC .................. 105/397, 401, 402, 456; 29/897.2
See application file for complete search history.

(56) References Cited

U.S. PATENT DOCUMENTS

| | | | |
|---|---|---|---|
| 5,433,151 A * | 7/1995 | Ohara ................... | B61D 17/04 105/397 |
| 6,431,083 B1 * | 8/2002 | Carstensen .......... | B61D 17/043 105/238.1 |
| 2013/0087068 A1 * | 4/2013 | Wang ................... | B61D 17/041 105/456 |
| 2014/0033949 A1 * | 2/2014 | Prockat ................ | B61D 17/041 105/392.5 |

OTHER PUBLICATIONS

Aug. 25, 2015 Office Action issued in Taiwanese Patent Application No. 102138892.
May 19, 2015 International Preliminary Report on Patentability issued in International Patent Application No. PCT/JP2013/006293.

* cited by examiner

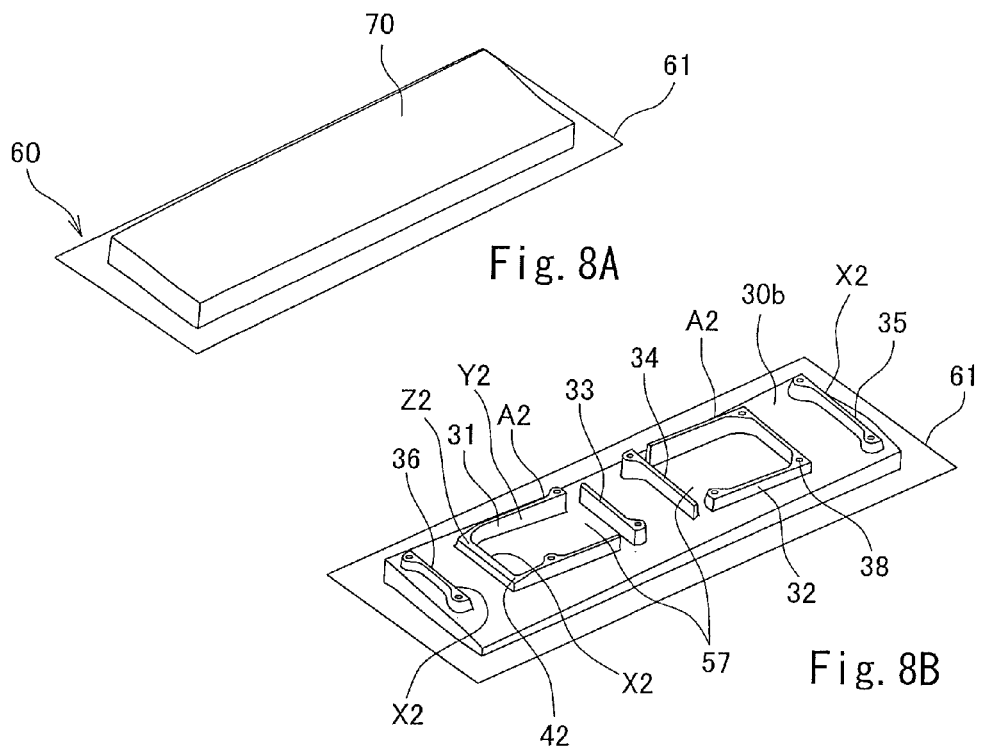
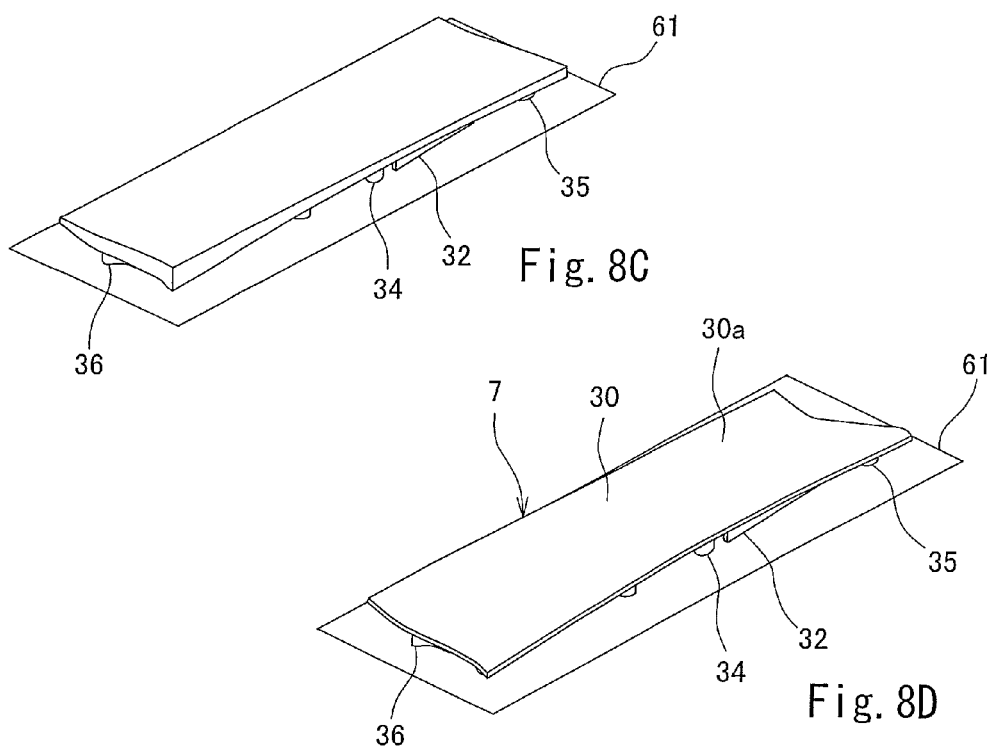

CURVED PLATE FOR RAILCAR BODYSHELL, FRONT CAR BODYSHELL, AND METHOD OF MANUFACTURING CURVED PLATE FOR RAILCAR BODYSHELL

TECHNICAL FIELD

The present invention relates to a curved plate for a railcar bodyshell, a front car bodyshell, and a method of manufacturing the curved plate for the railcar bodyshell.

BACKGROUND ART

A front car of a high speed railcar has a three-dimensional streamline shape and is formed such that an outside plate of a front car bodyshell is machined to have a predetermined curved shape. The outside plate of the front car bodyshell may be manufactured by bending a metal plate by manual work or the like or may be manufactured by cutting a metal material by machining. In the case of manufacturing the outside plate by the bending, the outside plate has a three-dimensional curved surface, so that the outside plate does not have a flat surface serving as a reference. Therefore, mounting dimension control is difficult when performing work of fixing the outside plate to a frame of the car. In contrast, in the case of manufacturing the outside plate by the machining, the metal material needs to have a machining reference surface used to fix the metal material to a surface plate of a machining device. However, since the outside plate has the three-dimensional curved surface, the machining reference surface does not normally coincide with a mounting reference surface necessary when mounting the outside plate to the frame of the car, so that the machining reference surface cannot be utilized as the mounting reference surface.

According to a method of manufacturing a curved plate in PTL 1, point marks are formed at predetermined positions of an outer peripheral portion of the press-formed curved plate. The point marks are placed on jacks of the machining device, and the heights of the jacks are adjusted to reference heights. Ribs are formed by cutting one of surfaces of the curved plate by the machining. By further cutting the other surface of the curved plate, the curved plate is finished to have a predetermined shape and a predetermined thickness. Finally, the outer peripheral portion of the curved plate is trimmed.

CITATION LIST

Patent Literature

PTL 1: Japanese Patent No. 3717426

SUMMARY OF INVENTION

Technical Problem

However, in PTL 1, the curved plate does not have the mounting reference surface, so that the mounting dimension control when performing the work of mounting the curved plate to the frame of the car requires skill At the time of the machining, the heights of the jacks need to be adjusted such that the curved plate as a machined target is positioned in a predetermined posture. Therefore, jigs such as the jacks are required, and height adjusting work is also required. Further, since the point marks or the like are formed at the outer peripheral portion of the curved plate, and the outer peripheral portion is finally trimmed, the material of the trimmed portion is wasted.

An object of the present invention is to facilitate the work of mounting the curved plate for the railcar bodyshell to the car, eliminate the need of the complex jigs for the machining and the need of the adjusting work, and reduce the waste of the material.

Solution to Problem

A curved plate for a railcar bodyshell according to the present invention includes: a plate main body including an outer surface facing an outside of a railcar and an inner surface facing an inside of the railcar and having a curved shape; and a plurality of reinforcing ribs projecting from the inner surface of the plate main body toward the inside of the railcar, wherein: at least two of the plurality of reinforcing ribs respectively include machining reference surfaces formed on a same plane as reference surfaces used when machining an outer surface of the plate main body; and at least one of the plurality of reinforcing ribs includes a mounting reference surface perpendicular to one of a rail direction, a sleeper direction, and a vertical direction as a reference surface used when mounting the curved plate to the railcar.

A method of manufacturing a curved plate for a railcar bodyshell according to the present invention is a method of manufacturing an outside plate having a curved shape and used for a front car of a railcar, the method including: machining an upper surface of a metal material to form a plurality of reinforcing ribs projecting upward; forming machining reference surfaces, formed on a same plane, on at least two of the plurality of reinforcing ribs; forming on at least one of the plurality of reinforcing ribs a mounting reference surface perpendicular to one of a rail direction, a sleeper direction, and a vertical direction as a reference surface used when mounting the curved plate to the railcar; turning upside down the metal material, on which the plurality of reinforcing ribs are formed, to place the machining reference surfaces on a surface plate of a machining device; and forming a plate main body by machining an upper surface of the metal material, whose machining reference surfaces are placed on the surface plate, by the machining device such that the metal material has the curved shape.

According to the above configuration or method, since at least one of the plurality of reinforcing ribs of the curved plate includes the mounting reference surface, mounting dimension control when mounting the curved plate to a frame of the railcar can be facilitated. When machining the outer surface of the plate main body, the machining reference surfaces of the reinforcing ribs are required to be placed on the surface plate of the machining device. Therefore, the need of complex jigs and the need of adjusting work can be eliminated. Further, since the machining reference surfaces and the mounting reference surfaces are formed on the reinforcing ribs, the last trimming is unnecessary, and the waste of the material and the machining time can be reduced. In a case where the machining reference surfaces and the mounting reference surfaces are formed outside members, a portion which is not used as the curved plate needs to be trimmed. However, according to the above configuration or method, the machining reference surfaces and the mounting reference surfaces are formed on the reinforcing ribs, so that the machining shape can be made simpler and the number of portions which are unnecessary in terms of structure can be made smaller than a case where the machining reference surfaces and the mounting reference surfaces are formed separately from the reinforcing ribs. This can also contribute to the weight reduction and the space saving.

Advantageous Effects of Invention

As is clear from the above explanation, the present invention can facilitate the mounting of the curved plate for the railcar bodyshell to the railcar, eliminate the need of the complex jigs for the machining and the need of the adjusting work, reduce the waste of the material, simplify the machining shape, and contribute to the weight reduction and the space saving by reducing the portions which are unnecessary in terms of structure.

BRIEF DESCRIPTION OF DRAWINGS

FIGS. 8A to 8D are perspective views for explaining a procedure of manufacturing the curved plate.

DESCRIPTION OF EMBODIMENTS

Hereinafter, an embodiment will be explained in reference to the drawings.

Figure 1:
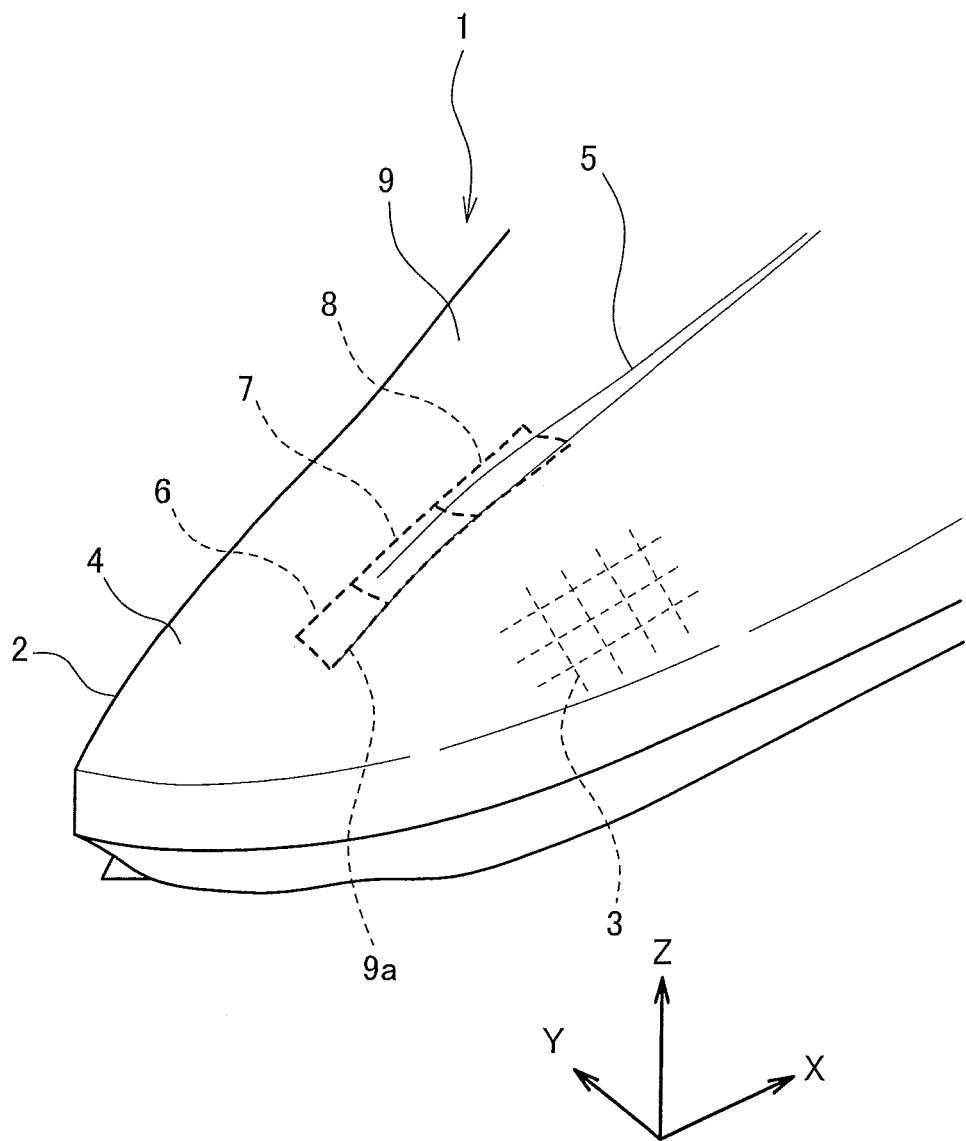
FIG. 1 is a perspective view showing a front car bodyshell of a railcar according to an embodiment.

FIG. 1 is a perspective view showing a front car bodyshell 2 of a railcar 1 according to the embodiment. As shown in FIG. 1, the front car bodyshell 2 includes: a lattice frame 3 configured along the outline of a carbody; and an outside plate 4 fixed to the frame 3 from an outside of the railcar. The outside plate 4 is formed in a streamline shape having a three-dimensional curved surface. A bent line 5 is formed on an outer surface of a part of the outside plate 4. The bent line 5 is formed such that as the bent line 5 extends toward a front side, a bending degree of the bent line 5 gradually decreases, and the bent line 5 disappears. The outside plate 4 includes three curved plates 6 to 8 located at a portion including a front portion of the bent line 5 and lined up in a front-rear direction along the bent line 5. The curved plates 6 to 8 are formed by machining metal materials. A main portion 9 of the outside plate 4 other than the curved plates 6 to 8 is formed by bending a metal plate. A part of the main portion 9 of the outside plate 4 has an opening 9a, and the curved plates 6 to 8 are fitted in the opening 9a to be welded to the frame 3. Generally, in the case of the bending, the metal material is not so wasted, but the bending of a complex shape requires skill. In the case of the machining, the skill is no required, and the complex shape can be realized, but the cut metal materials are wasted. In the present embodiment, the main portion 9 of the outside plate 4 is formed by the bending, and the curved plates 6 to 8 having complex shapes are formed by the machining Therefore, both reducing the waste of the metal material and forming the complex shape with a high degree of accuracy without requiring skill can be realized.

Figure 2:
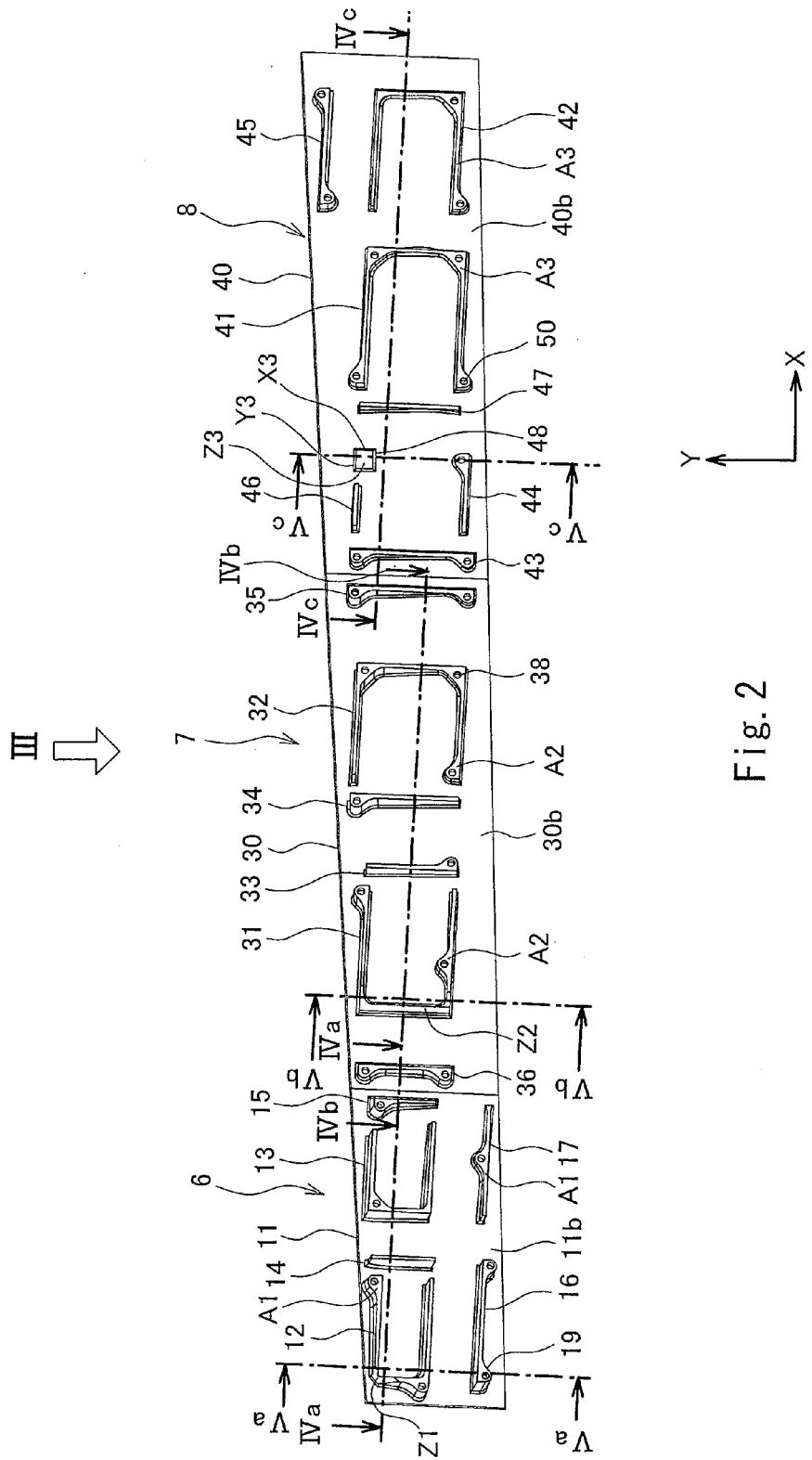
FIG. 2 is a bottom view showing curved plates for the front car bodyshell of FIG. 1 when viewed from below.
Figure 3:
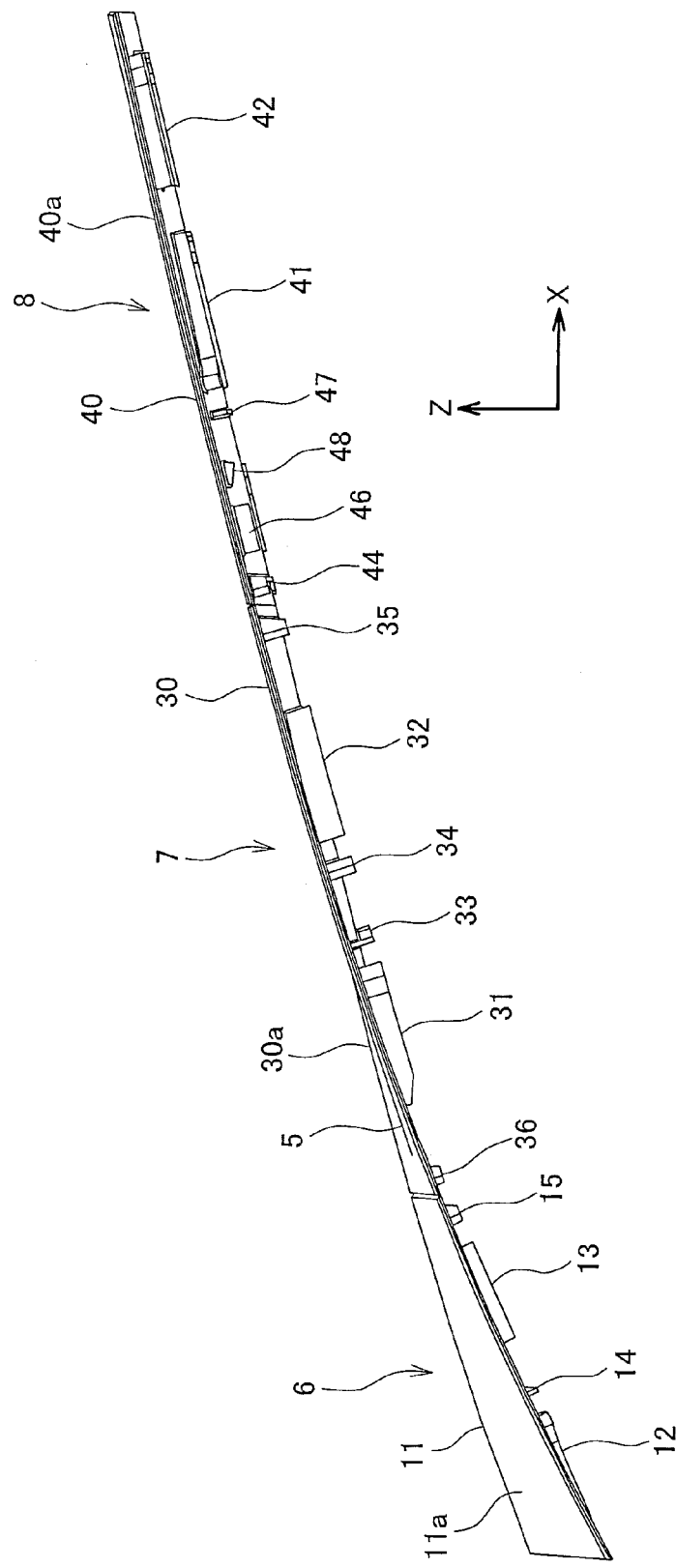
FIG. 3 is a side view when viewed from a direction indicated by an arrow III of FIG. 2.
Figure 4A:
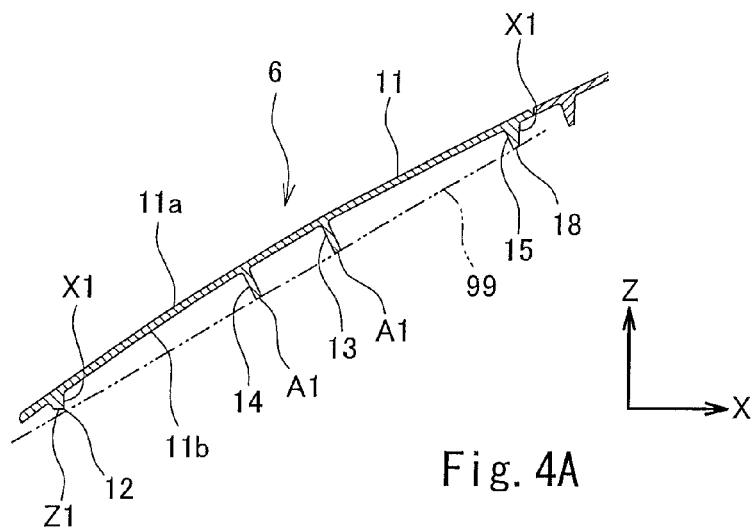
FIG. 4A is a cross-sectional view taken along line IVa-IVa of FIG. 2.
Figure 4B:
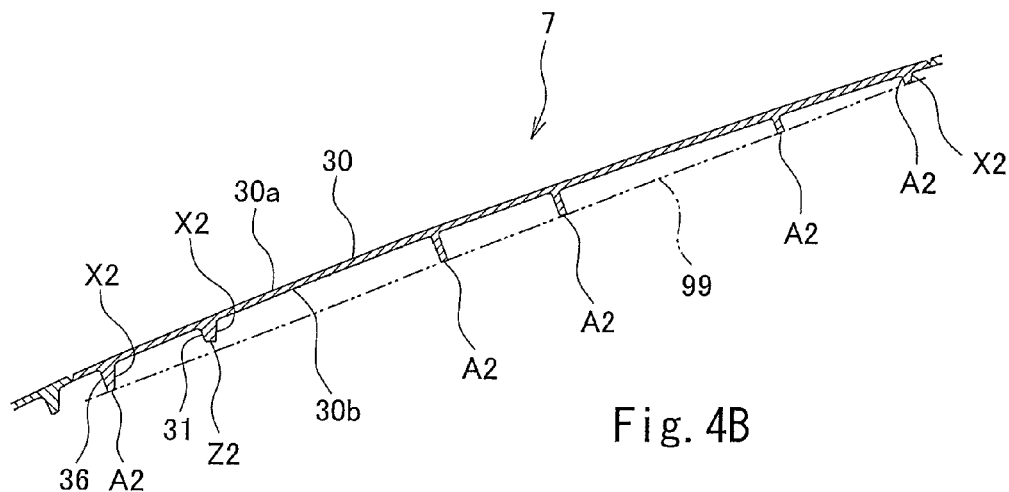
FIG. 4B is a cross-sectional view taken along line IVb-IVb of FIG. 2.
Figure 4C:
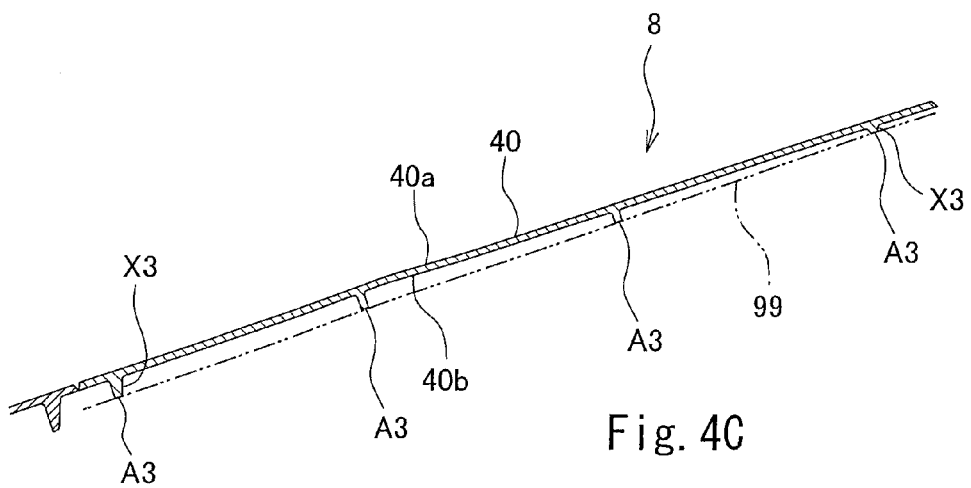
FIG. 4C is a cross-sectional view taken along line IVc-IVc of FIG. 2.
Figure 5A:
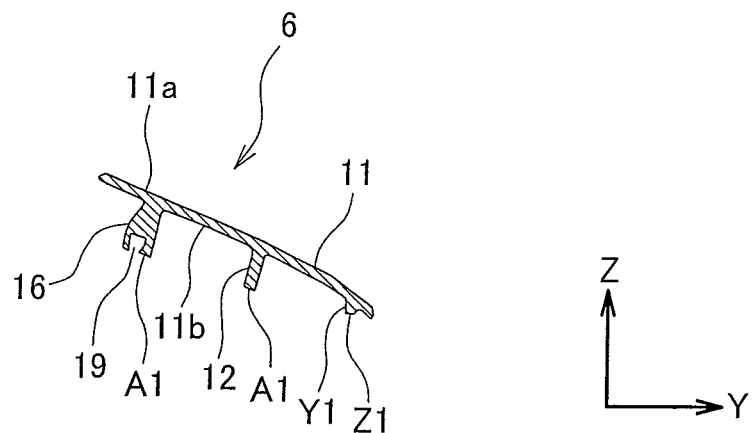
FIG. 5A is a cross-sectional view taken along line Va-Va of FIG. 2.
Figure 5B:
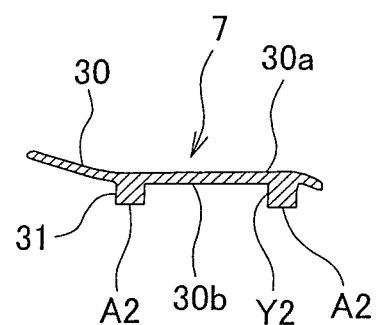
FIG. 5B is a cross-sectional view taken along line Vb-Vb of FIG. 2.
Figure 5C:
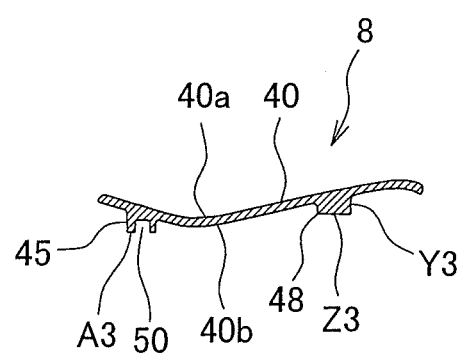
FIG. 5C is a cross-sectional view taken along line Vc-Vc of FIG. 2.

FIG. 2 is a bottom view showing the curved plates 6 to 8 for the front car bodyshell 2 of FIG. 1 when viewed from below. FIG. 3 is a side view when viewed from a direction indicated by an arrow III of FIG. 2. FIG. 4A is a cross-sectional view taken along line IVa-IVa of FIG. 2. FIG. 4B is a cross-sectional view taken along line IVb-IVb of FIG. 2. FIG. 4C is a cross-sectional view taken along line IVc-IVc of FIG. 2. FIG. 5A is a cross-sectional view taken along line Va-Va of FIG. 2. FIG. 5B is a cross-sectional view taken along line Vb-Vb of FIG. 2. FIG. 5C is a cross-sectional view taken along line Vc-Vc of FIG. 2. In FIGS. 2 to 5, a rail direction (car longitudinal direction) is represented by X, a sleeper direction (car width direction) is represented by Y, and a vertical direction is represented by Z. These three directions X, Y, and Z perpendicular to one another are directions used as references for positioning when mounting the curved plates 6 to 8 to the frame 3. Hereinafter, the curved plates 6 to 8 are explained separately.

The curved plate 6 includes: a plate main body 11 having a curved shape; and a plurality of reinforcing ribs 12 to 17. The plate main body 11 includes an outer surface 11a facing an outside of the railcar and an inner surface 11b facing an inside of the railcar. The reinforcing ribs 12 to 17 project from the inner surface 11b of the plate main body 11 toward the inside of the railcar. Portions of the plate main body 11 from which the reinforcing ribs 12 to 17 project have curved surfaces. The reinforcing ribs 12 to 17 are arranged so as to extend in two directions (directions X and Y) perpendicular to each other. Each of the reinforcing ribs 12 and 13 is formed to have a U shape in a plan view. The U-shaped reinforcing ribs 12 and 13 are arranged such that openings thereof face in the same direction. The belt-shaped reinforcing rib 14 is formed at the opening side of the reinforcing rib 12 so as to cover the opening of the reinforcing rib 12 and be spaced apart from the reinforcing rib 12. The belt-shaped reinforcing rib 15 is formed at the opening side of the reinforcing rib 13 so as to cover the opening of the reinforcing rib 13 and be spaced apart from the reinforcing rib 13. To be specific, the belt-shaped reinforcing rib 14 is spaced apart from the reinforcing rib 12, the reinforcing rib 12 having the U shape in a plan view, so as not to form a closed loop shape together with the reinforcing rib 12. The belt-shaped reinforcing rib 15 is spaced apart from the reinforcing rib 13, the reinforcing rib 13 having the U shape in a plan view, so as not to form a closed loop shape together with the reinforcing rib 13. The belt-shaped reinforcing rib 16 is formed at a predetermined position of an outer peripheral portion of the plate main body 11 so as to extend in a direction perpendicular to the reinforcing rib 14. The belt-shaped reinforcing rib 17 is formed at a predetermined position of the outer peripheral portion of the plate main body 11 so as to extend in a direction perpendicular to the reinforcing rib 15.

Flat machining reference surfaces A1 formed on a same plane 99 are respectively formed on projecting-side tip end surfaces of the reinforcing ribs 12 to 17 as reference surfaces used when machining the outer surface 11a of the plate main body 11. Predetermined positions of the machining reference surfaces A1 of the reinforcing ribs 12, 13, and 15 to 17 have positioning fixing holes 19 for positioning and fixing the reinforcing ribs 12, 13, and 15 to 17 at and to a surface plate at the time of the machining Mounting reference surfaces X1 perpendicular to the rail direction are respectively formed on a side surface of the reinforcing rib 12 and a side surface of the reinforcing rib 15 as rail-direction mounting dimension reference surfaces used when mounting the curved plate 6 to the frame 3. A mounting reference surface Y1 perpendicular to the sleeper direction is formed on another side surface of the reinforcing rib 12 as a sleeper-direction mounting dimension reference surface used when mounting the curved plate 6 to the frame 3. A mounting reference surface Z1 perpendicular to the vertical direction is formed on a part of the projecting-side tip end surface of the reinforcing rib 12 as a vertical-direction mounting dimension reference surface used when mounting the curved plate 6 to the frame 3. Although these mounting reference surfaces X1, Y1, and Z1 are surfaces different from the machining reference surface A1, the mounting reference surfaces X1, Y1, and Z1 are formed on the reinforcing ribs 12 and 15 each having the machining reference surface A1. The mounting reference surface Z1 inclines relative to a direction perpendicular to a projecting direction of the reinforcing rib 12. To be specific, a direction in which the mounting reference surface Z1 faces and a direction in which the machining reference surface A1 faces are different from each other.

The curved plate 7 includes: a plate main body 30 having a curved shape; and a plurality of reinforcing ribs 31 to 36. The plate main body 30 includes an outer surface 30a facing the outside of the railcar and an inner surface 30b facing the inside of the railcar. The reinforcing ribs 31 to 36 project from the inner surface 30b of the plate main body 30 toward the inside of the railcar. Portions of the plate main body 30 from which the reinforcing ribs 31 to 36 project have curved surfaces. The reinforcing rib 31 to 36 are arranged so as to extend in two directions (directions X and Y) perpendicular to each other. Each of the reinforcing ribs 31 and 32 is formed to have a U shape in a plan view. The U-shaped reinforcing ribs 31 and 32 are arranged such that openings thereof face each other. The belt-shaped reinforcing rib 33 is formed at the opening side of the reinforcing rib 31 so as to cover the opening of the reinforcing rib 31 and be spaced apart from the reinforcing rib 31. The belt-shaped reinforcing rib 34 is formed at the opening side of the reinforcing rib 32 so as to cover the opening of the reinforcing rib 32 and be spaced apart from the reinforcing rib 32. The belt-shaped reinforcing ribs 35 and 36 are formed at predetermined positions of an outer peripheral portion of the plate main body 30 so as to be parallel to the reinforcing ribs 33 and 34.

Flat machining reference surfaces A2 formed on the same plane 99 are respectively formed on projecting-side tip end surfaces of the reinforcing ribs 31 to 36 as reference surfaces used when machining the outer surface 30a of the plate main body 30. Predetermined positions of the machining reference surfaces A2 of the reinforcing ribs 31 to 36 have positioning holes 38 for positioning the reinforcing ribs 31 to 36 at the surface plate at the time of the machining. Mounting reference surfaces X2 perpendicular to the rail direction are respectively formed on a side surface of the reinforcing rib 31 and a side surface of the reinforcing rib 36 as rail-direction mounting dimension reference surfaces used when mounting the curved plate 7 to the frame 3. A mounting reference surface Y2 perpendicular to the sleeper direction is formed on another side surface of the reinforcing rib 31 as a sleeper-direction mounting dimension reference surface used when mounting the curved plate 7 to the frame 3. A mounting reference surface Z2 perpendicular to the vertical direction is formed on a part of the projecting-side tip end surface of the reinforcing rib 31 as a vertical-direction mounting dimension reference surface used when mounting the curved plate 7 to the frame 3. Although these mounting reference surfaces X2, Y2, and Z2 are surfaces different from the machining reference surface A2, the mounting reference surfaces X2, Y2, and Z2 are formed on the reinforcing ribs 31, 35, and 36 each having the machining reference surface A2. The mounting reference surface Z2 inclines relative to a direction perpendicular to the projecting direction of the reinforcing rib 31. To be specific, a direction in which the mounting reference surface Z2 faces and a direction in which the machining reference surface A2 faces are different from each other.

The curved plate 8 includes: a plate main body 40 having a curved shape; and a plurality of reinforcing ribs 41 to 48. The plate main body 40 includes an outer surface 40a facing the outside of the railcar and an inner surface 40b facing the inside of the railcar. The reinforcing ribs 41 to 48 project from the inner surface 40b of the plate main body 40 toward the inside of the railcar. have curved surfaces, the reinforcing ribs 41 to 48 projecting from the portions of the plate main body 40. Each of the reinforcing ribs 41 and 42 is formed to have a U shape in a plan view. The U-shaped reinforcing ribs 41 and 42 are arranged such that openings thereof face in the same direction. The belt-shaped reinforcing rib 47 is formed at the opening side of the reinforcing rib 41 so as to cover the opening of the reinforcing rib 41 and be spaced apart from the reinforcing rib 41. The belt-shaped reinforcing ribs 43 to 46 are formed at predetermined positions of an outer peripheral portion of the plate main body 40. The reinforcing rib 48 is a square prism rib.

Flat machining reference surfaces A3 formed on the same plane 99 are respectively formed on projecting-side tip end surfaces of the reinforcing rib 41 to 47 as reference surfaces used when machining the outer surface 40a of the plate main body 40. Predetermined positions of the machining reference surfaces A3 of the reinforcing ribs 41 to 45 have positioning holes 50 for positioning the reinforcing ribs 41 to 45 at the surface plate at the time of the machining. Mounting reference surfaces X3 perpendicular to the rail direction are respectively formed on a side surface of the reinforcing rib 42, a side surface of the reinforcing rib 43, and a side surface of the reinforcing rib 48 as rail-direction mounting dimension reference surfaces used when mounting the curved plate 8 to the frame 3. A mounting reference surface Y3 perpendicular to the sleeper direction is formed on another side surface of the reinforcing rib 48 as a sleeper-direction mounting dimension reference surface used when mounting the curved plate 8 to the frame 3. A mounting reference surface Z3 perpendicular to the vertical direction is formed on the projecting-side tip end surface of the reinforcing rib 48 as a vertical-direction mounting dimension reference surface used when mounting the curved plate 8 to the frame 3. Although the mounting reference surfaces X3, Y3, and Z3 are formed on the reinforcing rib 48, the machining reference surface A3 is not formed on the reinforcing rib 48. The mounting reference surface Z3 inclines relative to a direction perpendicular to the projecting direction of the reinforcing rib 48. To be specific, a direction in which the mounting reference surface Z3 faces and a direction in which the machining reference surface A3 faces are different from each other.

Figure 6:
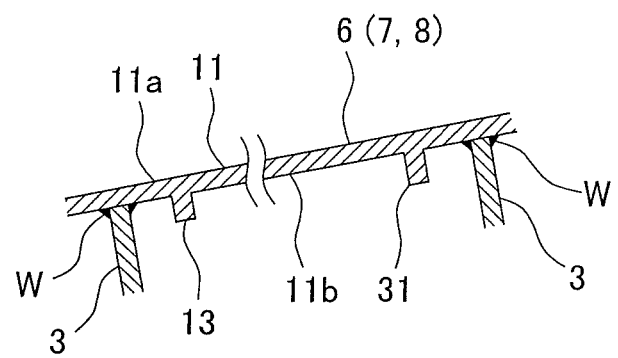
FIG. 6 is a major portion cross-sectional view showing a state where the curved plate of FIG. 2 is fixed to a frame.
Figure 7:
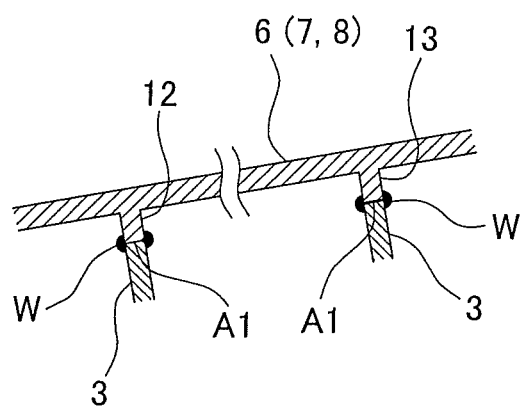
FIG. 7 is a major portion cross-sectional view showing a modification example of the state where the curved plate is fixed to the frame.

FIG. 6 is a major portion cross-sectional view showing a state where the curved plate 6, 7, or 8 of FIG. 2 is fixed to the frame 3. As shown in FIG. 6, the curved plates 6 to 8 are fixed such that the inner surface 11b of the plate main body 11 is welded to outer end surfaces of the frame 3 of the carbody. With this, positioning between the reinforcing rib 13, 31 and the frame 3 becomes unnecessary, so that the degree of freedom of design of the reinforcing ribs 13 and 31 and the frame 3 increases. Since the reinforcing ribs 13 and 31 are provided in the vicinity of the frame 3, the distortion of the curved plate 7 by the welding can be suppressed. However, as shown in FIG. 7, the outer end surfaces of the frame 3 may be welded to the machining reference surfaces A1 of the reinforcing ribs 12 and 13 of the curved plates 6 to 8. With this, a thermal influence on the plate main body 11 by the welding can be suppressed.

FIGS. 8A to 8D are perspective views for explaining a procedure of manufacturing the curved plate 7. In FIGS. 8A to 8D, the procedure of manufacturing the curved plate 7 will be explained among the curved plates 6 to 8. First, as shown in FIG. 8A, a metal material 70 that is a thick, rectangular plate is placed on a surface plate 61 of a machining device 60. Next, as shown in FIG. 8B, an upper surface of the metal material 70 is cut by the machining Thus, the inner surface 30b having a predetermined shape and the reinforcing ribs 31 to 36 are formed. At this time, the flat machining reference surfaces A2 formed on the same plane are respectively formed on the projecting-side tip end surfaces of the reinforcing rib 31 to 36, and the predetermined positions of the machining reference surfaces A2 have the positioning holes 38. The mounting reference surfaces X2 perpendicular to the rail direction are formed on the side surfaces of the reinforcing rib 31, 35, and 36. The mounting reference surface Y2 perpendicular to the sleeper direction is formed on another side surface of the reinforcing rib 31. The mounting reference surface Z2 perpendicular to the vertical direction is formed on a part of the projecting-side tip end surface of the reinforcing rib 31. Before the next step, cut chips remaining among the reinforcing ribs 31 to 36 are washed away with water. At this time, since a surface of a region surrounded by the U-shaped reinforcing rib 31 and a surface of a region surrounded by the U-shaped reinforcing rib 32 on the inner surface 30b incline, and openings 57 of the U-shaped reinforcing ribs 31 and 32 are formed to face toward a lower side of the inclination, the cut chips do not remain in the region surrounded by the U-shaped reinforcing rib 31 and the region surrounded by the U-shaped reinforcing rib 32 and are easily discharged to the outside.

Next, as shown in FIG. 8C, the metal material on which the reinforcing ribs 31 to 36 are formed is turned upside down, and the machining reference surfaces A2 are placed on the surface plate 61. At this time, fixtures (not shown), such as pins or bolts, which can project from and retract into the surface plate are inserted into the positioning holes 38. As shown in FIG. 8D, an upper surface of the metal material whose machining reference surfaces A2 are placed on the surface plate 61 is machined by the machining device such that the metal material has a curved shape. Thus, the outer surface 30a of the plate main body 30 is formed. As a result, the curved plate 7 is completed. During this machining, the machined target is entirely supported by the reinforcing ribs 31 to 36, not by only the outer peripheral portion. Therefore, the decrease in the machining accuracy due to the deflection or flapping of a middle portion of the curved plate by the load from a machining tool at the time of the machining is prevented.

According to the above-explained configuration, since the reinforcing ribs 12, 15, 31, 35, 42, 43, and 48 of the curved plates 6 to 8 include the mounting reference surfaces X1, Y1, Z1, X2, Y2, Z2, X3, Y3, and Z3, mounting dimension control when mounting the curved plates 6 to 8 to the frame 3 of the car can be facilitated. When machining the outer surfaces 11a, 30a, and 40a of the plate main bodies 11, 30, and 40, the machining reference surfaces A1 to A3 of the reinforcing ribs 12 to 17, 31 to 36, and 41 to 47 are required to be placed on the surface plate 61 of the machining device 60. Therefore, the need of complex jigs and the need of adjusting work can be eliminated. Further, the machining reference surfaces A1 to A3 and the mounting reference surfaces X1 to Z1, X2 to Z2, and X3 to Z3 are formed on the reinforcing ribs 12 to 17, 31 to 36, and 41 to 48. Therefore, the last trimming is not required, and the waste of the material can be reduced. The machining reference surfaces A1 to A3 and the mounting reference surfaces X1 to Z1, X2 to Z2, and X3 to Z3 are formed on the reinforcing ribs 12 to 17, 31 to 36, and 41 to 48. Therefore, the machining shape can be made simpler and the number of portions unnecessary in terms of structure can be made smaller than a case where the machining reference surfaces A1 to A3 and the mounting reference surfaces X1 to Z1, X2 to Z2, and X3 to Z3 are formed on separate targets. This can also contribute to the weight reduction and the space saving. Since the reinforcing ribs 12 to 27, 31 to 36, and 41 to 48 are formed on the plate main bodies 11, 30, and 40, not only the stiffness of only the plate main body but also the stiffness of the entire structure can be improved.

The present invention is not limited to the above embodiment, and modifications, additions, and eliminations may be made within the scope of the present invention. The above embodiments may be combined arbitrarily. For example, a part of components or methods in one embodiment may be applied to another embodiment.

INDUSTRIAL APPLICABILITY

As above, each of the curved plate for the railcar bodyshell, the front car bodyshell, and the method of manufacturing the curved plate for the railcar bodyshell according to the present invention has excellent effects of: facilitating the mounting of the curved plate for the railcar bodyshell to the car; eliminating the need of the complex jigs for the machining and the need of the adjusting work; reducing the waste of the material; simplifying the machining shape; and being able to contribute to the weight reduction and the space saving by reducing the portions which are unnecessary in terms of structure. Thus, it is useful to apply the present invention to railcars which can achieve the significance of these effects.

REFERENCE SIGNS LIST 1 railcar
2 front car bodyshell
3 frame
4 outside plate
6 to 8 curved plate
11, 30, 40 plate main body
11a, 30a, 40a outer surface
11b, 30b, 40b inner surface
12 to 17, 31 to 36, 41 to 48 reinforcing rib
A1, A2, A3 machining reference surface
X1, X2, X3 mounting reference surface (rail direction)
Y1, Y2, Y3 mounting reference surface (sleeper direction)
Z1, Z2, Z3 mounting reference surface (vertical direction)

The invention claimed is:
1. A curved plate for a railcar bodyshell, the curved plate comprising:

a plate main body including: (i) an outer surface facing an outside of a railcar, and (ii) an inner surface facing an inside of the railcar, the plate main body having a curved shape; and a plurality of reinforcing ribs projecting from the inner surface of the plate main body toward the inside of the railcar, at least two of the plurality of reinforcing ribs respectively including machining reference surfaces formed on a same plane as reference surfaces used when machining an outer surface of the plate main body such that the outer surface has the curved shape, and at least one of the plurality of reinforcing ribs including a mounting reference surface perpendicular to one of: a rail direction, a sleeper direction, and a vertical direction as a reference surface used when mounting the curved plate to the railcar.

2. The curved plate according to claim 1, wherein each machining reference surface and the mounting reference surface are surfaces different from each other.

3. The curved plate according to claim 1, wherein at least one of the plurality of reinforcing ribs has a U shape in a plan view.

4. A front car bodyshell comprising:

an outside plate formed by the curved plate according to claim 1; and a frame fixed to the outside plate from the inside of the railcar, wherein at least a part of the outside plate is formed by machining.

5. The front car bodyshell according to claim 4, wherein an end surface of the frame is welded to the machining reference surfaces of the reinforcing ribs of the curved plate.

6. A method of manufacturing a curved plate for a front car of a railcar bodyshell, the method comprising:

forming a plurality of reinforcing ribs to an upper surface of a metal material by machining the upper surface of the metal material, the plurality of reinforcing ribs projecting upward;

forming machining reference surfaces on at least two of the plurality of reinforcing ribs, the machining reference surfaces being formed on same plane;

forming on at least one of the plurality of reinforcing ribs a mounting reference surface perpendicular to one of: a rail direction, a sleeper direction, and a vertical direction as a reference surface used when mounting the curved plate to the railcar;

turning upside down the metal material, on which the plurality of reinforcing ribs are formed;

placing the machining reference surfaces on a surface plate of a machining device; and forming, by the machining device, a plate main body by machining an upper surface of the metal material such that the metal material has the curved shape, machining reference surfaces of the upper surface of the metal material being placed on the surface plate.

7. A curved plate for a railcar bodyshell, the curved plate comprising:

a plate main body including: (i) an outer surface facing an outside of a railcar, and (ii) an inner surface facing an inside of the railcar, the plate main body having a curved shape: and a plurality of reinforcing ribs projecting from the inner surface of the plate main body toward the inside of the railcar, at least two of the plurality of reinforcing ribs respectively including machining reference surfaces formed on a same plane as reference surfaces used when machining an outer surface of the plate main body, and at least one of the plurality of reinforcing ribs including a mounting reference surface perpendicular to one of: a rail direction, a sleeper direction, and a vertical direction as a reference surface used when mounting the curved plate to the railcar, wherein:

the mounting reference surface includes a projecting-side tip end surface of the at least one of the plurality of reinforcing ribs; and the tip end surface inclines relative to a direction perpendicular to a projecting direction of the at least one of the plurality of reinforcing ribs.

\* \* \* \* \*